No. 779,926. PATENTED JAN. 10, 1905.
B. W. GRICE.
PLOW GAGE.
APPLICATION FILED OCT. 28, 1904.
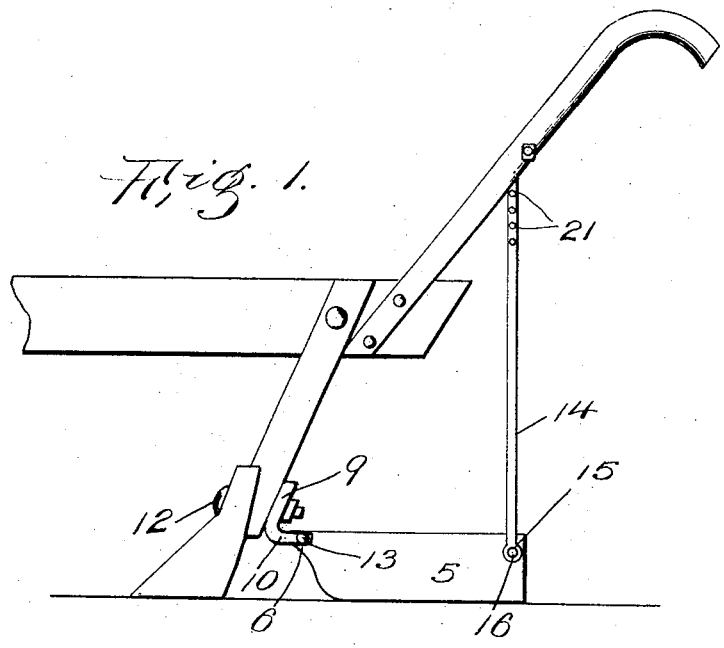
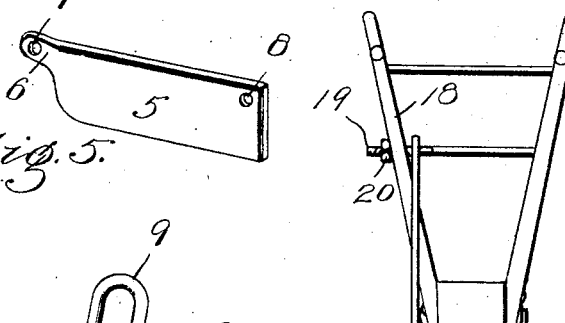
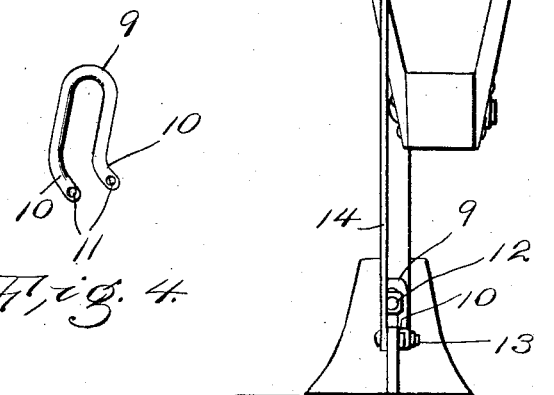
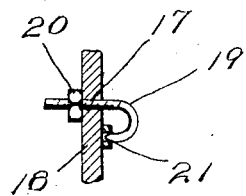
Witnesses
Inventor
B. W. Grice
By
Attorneys No. 779,926. Patented January 10, 1905.

UNITED STATES PATENT OFFICE.

BENJAMIN W. GRICE, OF FORT JESUP, LOUISIANA.

PLOW-GAGE.

SPECIFICATION forming part of Letters Patent No. 779,926, dated January 10, 1905.

Application filed October 28, 1904. Serial No. 230,369.

*To all whom it may concern:*

Be it known that I, BENJAMIN W. GRICE, a citizen of the United States, residing at Fort Jesup, in the parish of Sabine, State of Louisiana, have invented certain new and useful Improvements in Plow-Gages; and I do hereby declare the following to be a full, clear, and exact description of the invention, such as will enable others skilled in the art to which it appertains to make and use the same.

This invention relates to gages for plows, and has for its object to provide a gage which while being efficient will be extremely simple and cheap, so that it may be made quickly and with little labor.

A particular object of the invention is to provide a gage which may be made by a person possessing only ordinary ability in the handling of tools, so that in exploiting the invention the right to make the gages may be sold to farmers and others throughout the country.

Other objects and advantages will be apparent from the following description, and it will be understood that modifications of the specific construction shown may be made and any suitable materials may be used without departing from the spirit of the invention.

In the drawings, forming a portion of this specification, and in which like numerals of reference indicate similar parts in the several views, Figure 1 is a side elevation of a plow provided with the present invention. Fig. 2 is a rear elevation. Fig. 3 is a detail sectional view of one of the handles and showing the hook. Fig. 4 is a view of the attaching-yoke. Fig. 5 is a view of the gage-plate.

Referring now to the drawings, the present invention comprises a gage-plate 5, which may be formed from suitable sheet metal and which has a finger 6 at its upper forward corner. This finger 6 and the upper rearward corner of the plate are provided with perforations 7 and 8, respectively.

An attaching-yoke 9 is provided, which consists of a metallic bar bent into U shape, the end portions 10 of the bar being bent outwardly parallel to each other and having alining perforations 11. This yoke is engaged with the heel-bolt 12 of the plow and may be adjusted longitudinally, as will be readily understood. The finger 6 is disposed between the portions 10 of the yoke, and a pivot-bolt 13 is passed through the perforations 11 and 7.

A vertical rod 14 is provided with a perforation 15 at its lower end, and engaged with this perforation and the perforation 8 there is a pivot-bolt 16.

A metallic hook, formed from a bar of suitable metal, has the end of its shank engaged in a perforation 17 in one of the handles 18 of the plow, this hook being indicated at 19, and the shank of the hook is provided with threads, with which there is engaged a nut which draws the bill of the hook into a perforation 21 of the rod 14, there being a series of such perforations, so that the plate 5 may be adjusted, as will be readily understood.

The operation of the invention will be apparent without further description.

What is claimed is—

As an article of manufacture, a gage for plows comprising a gage-plate having a perforated finger at its forward end, an attaching-yoke formed of a metallic rod bent into U shape and having its end portions bent at an angle and lying parallel to each other, said end portions having alining perforations therethrough, a pivot-bolt engaged with the perforations of the yoke and with that of the finger, said yoke being arranged for engagement with the heel-bolt of a plow, a rod pivoted to the rearward end of the plate and provided with a longitudinal series of spaced perforations, and a hook arranged for engagement of its shank in one of the handles of a plow and adapted for engagement of its bill in the perforations of the rod interchangeably.

In testimony whereof I affix my signature in presence of two witnesses.

BENJAMIN W. GRICE.

Witnesses:
J. A. SPRIGHT,
W. H. VANDEGAER.